United States Patent [19]

Hershey et al.

[11] Patent Number: 5,568,522
[45] Date of Patent: Oct. 22, 1996

[54] CORRECTION OF MULTIPATH DISTORTION IN WIDEBAND CARRIER SIGNALS

[75] Inventors: John E. Hershey, Ballston Lake; Gary J. Saulnier, Rexford, both of N.Y.

[73] Assignee: General Electric Company, Schenectady, N.Y.

[21] Appl. No.: 407,559

[22] Filed: Mar. 20, 1995

[51] Int. Cl.[6] .................................. H04B 7/12; H04L 1/04
[52] U.S. Cl. .......................... 375/346; 375/285; 375/260; 375/200; 455/59; 455/65
[58] Field of Search ..................................... 375/226, 260, 375/285, 296, 346, 200; 370/121; 455/59, 65, 67.4, 67.6, 304

[56] References Cited

U.S. PATENT DOCUMENTS

| | | | |
|---|---|---|---|
| 4,601,046 | 7/1986 | Halpern et al. | 375/260 |
| 5,206,886 | 4/1993 | Bingham | 375/344 |
| 5,228,062 | 7/1993 | Bingham | 375/344 |
| 5,260,972 | 11/1993 | Wang | 375/346 |
| 5,414,734 | 5/1995 | Marchetto et al. | 375/346 |

OTHER PUBLICATIONS

U.S. patent application entitled "Dynamic Code Division Multiple Access Communication System", (Attorney Docket No. RD-24193) J. E. Hershey, A. A. Hassan, G. J. Saulnier.

U.S. patent application entiled "Method of Geometric Harmonic Modulation (GHM)", (Attorney Docket No. RD-23786), J. E. Hershey, G. J. Saulnier, A. A. Hassan.

U.S. patent application entitled "Geometric Harmonic Modulation (GHM) –Digital Implemenatation", (Attorney Docket No. RD-24194), J. E. Hershey, G. J. Saulnier, A. A. Hassan.

U.S. patent application entitled "Geometric Harmonic Modulation (GHM) for Combined Analog/Digital Transmissions", (Attorney Docket No. RD-24195), J. E. Hershey, G. J. Saulnier, A. A. Hassan.

U.S. patent application entitled "Geometric Harmonic Modulation (GHM) –Analog Implementation", (Attorney Docket No. RD-24203), J. E. Hershey, G. J. Saulnier, A. A. Hassan.

U.S. patent application entitled "Interlaced Geometric Harmonic Modulation", (Attorney Docket No. RD-24223), J. E. Hershey.

*Primary Examiner*—Stephen Chin
*Assistant Examiner*—Jeffrey W. Gluck
*Attorney, Agent, or Firm*—Lawrence P. Zale; Marvin Snyder

[57] ABSTRACT

The present invention provides a system for determining, and correcting for, channel-induced distortion in transmitted wideband carrier signals. During a synchronization, or sounding mode, known as the preamble mode, a wideband signal consisting of a number of tones, which may be those of geometric harmonic modulation (GHM), each having a phase of zero are transmitted to a receive unit. At the receive unit, the phases for each tone are extracted. Since each tone is at a different frequency, a snapshot of the change in phase over a number of frequencies can be determined. These phase changes are employed in determining the generalized phase distortion over frequency equation which is used to remove the phase distortion induced by the channel before decoding of the signal. The device then operates in its traffic mode thereby transmitting information to a receive unit which uses the phase distortion information to remove phase distortion induced by the channel and then decode a message signal.

6 Claims, 2 Drawing Sheets

CORRECTION OF MULTIPATH DISTORTION IN WIDEBAND CARRIER SIGNALS

CROSS REFERENCES TO RELATED APPLICATIONS

This application is related to U.S. patent applications "Method Of Geometric Harmonic Modulation (GHM)" Ser. No. 08/407,560, "Geometric Harmonic Modulation (GHM)—Analog Implementation" Ser. No. 08/407,088, "Geometric Harmonic Modulation (GHM) For Combined Analog/Digital Transmissions" Ser. No. 08/407,555, "Geometric Harmonic Modulation (GHM)—Digital Implementation" Ser. No. 08/407,554 by Hershey, Saulnier, Hassan; "Dynamic Code Division Multiple Access Communication System" Ser. No. 08/407,552 by Hershey, Hassan, Saulnier; "Interlaced Geometric Harmonic Modulation" Ser. No. 08/407,551 by John Hershey, all filed Mar. 20, 1995 all assigned to the present assignee and hereby incorporated by reference.

BACKGROUND OF THE INVENTION

1. Field of the Invention

This invention relates to communication through a channel, and more specifically to correction of distortion introduced into wideband signals communicated through a channel.

2. Description of Related Art

Analog or digital information typically is transmitted from one place to another through a channel. A channel is a general term referring to the medium through which a signal is transmitted. The channel may be a radio transmission, local area network transmission, telephone transmission, etc. In each case, the received signal differs from the transmitted signal due to the effects of the transmission through the channel. A transmitted signal may travel by a first path directly from a transmit unit to a receive unit having a distance $d_1$. This is the most desirable transmission path, however there are cases when the transmitted signal travels by alternate paths. The signal may, in the case of a radio channel, be reflected from an obstacle, such as a mountain, to the receive unit over a second path having a distance $d_2$, being longer than $d_1$. The transmission over the second path arrives at the receive unit slightly later as an 'echo'. There may also be several paths and echoes. The condition of several signals arriving at the receive unit if referred to as 'multipath propagation'.

Since signals arriving via different paths travel different distances, the phases detected at the receive unit are different. This causes significant problems in decoding signals with several signals received approximately at the same time with unknown phases.

In most communication systems it is desirable to have knowledge of this channel information, known as channel state information (CSI) at any instant of time in order to properly decode the transmitted information.

Currently there is a need for a simplified method of correcting channel induced phase distortion in wideband signals.

SUMMARY OF INVENTION

Communications systems employing a carrier waveform having a plurality of tones with each tone having predefined frequency $\omega_i$, phase $\phi_i$ and magnitude $m_i$, experience phase distortion as the waveform is transmitted through a channel. The present invention determines this distortion by first receiving a waveform transmitted with known phases.

A phase $\phi_i'$ and magnitude $m_i'$ are extracted from each of the tones of the transmitted waveform at a receive unit.

The extracted phases/magnitudes ($\phi_i',m_i'$) are compared to the known phases/magnitudes ($\phi_i,m_i$) employed at the transmit unit for each frequency to determine a phase distortion $\xi_i$ for each tone. A channel distortion relation $dC/d\omega$ being change in phase $\phi$ per change in frequency $\omega$ due to said channel is determined from the phase distortions $\xi_i$ of the tones.

The channel distortion relation $dC/d\omega$ is then employed in correcting individual tones of a message waveform transmitted through said channel to result in a corrected signal having reduced phase distortion as compared with conventional systems.

OBJECTS OF THE INVENTION

An object of the present invention is to provide a system for correction of channel-induced phase distortion in a transmitted wideband signal.

Another object of the present invention is to provide a system which exhibits greater error tolerance in a transmitted wideband signal compared with conventional systems.

Another object of the present invention is to provide a simplified wideband communications device with increased performance over channels experiencing multipath propagation compared with conventional systems.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENT

Multipath propagation is inherent in many types of channel access modulation schemes. The multipath propagation will cause, among other effects, a frequency selective phase rotation. This rotation, if uncorrected, may lead to an increase of the bit error rate and even incorrect recovery of the code phases $\{\phi_i\}$. The present invention estimates the relevant parameters of such multipath and corrects for its phase rotation effects induced by transmission through the channel.

The present invention is particularly applicable to a carrier waveform which can be expressed as a sum of tones of fixed frequencies and phase over the symbol interval. This applies to the U.S. patent applications referenced in the "Cross References To Related Applications", employing a carrier waveform comprised of tones being geometrically increasing multiples of a fundamental frequency. These tones are each offset by a phase, and the phase-offset tones added to create a preamble carrier waveform, or multiplied to create a traffic carrier waveform. This is termed geometric harmonic modulation ("GHM").

Figure 1A:
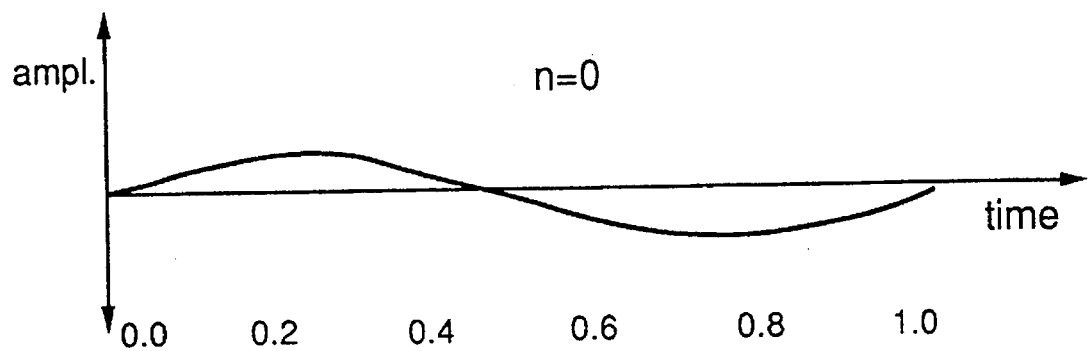
FIGS. 1a, 1b, 1c are graphs of the wave function $W_n(0, 1;t)$ for n=0,3,6, respectively, used in connections with explaining the present invention.
Figure 1B:
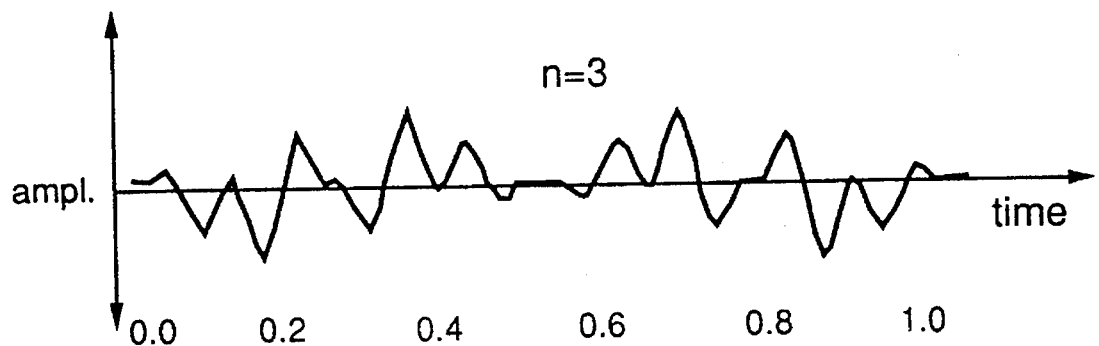
Figure 1C:
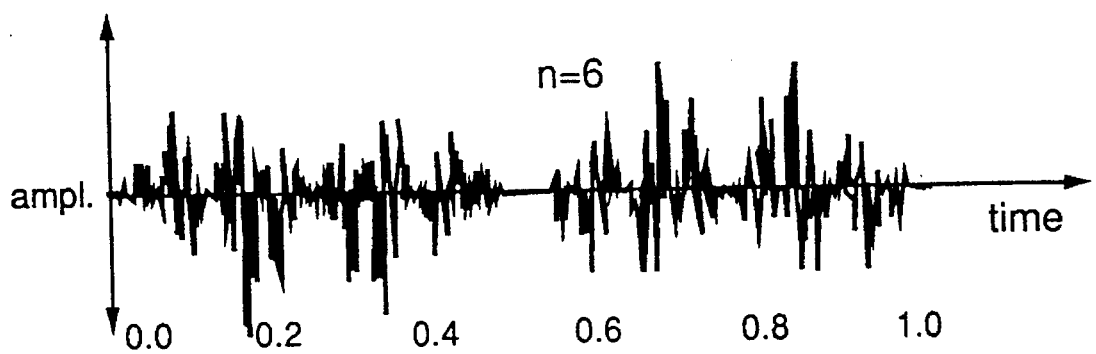

FIGS. 1a, 1b, 1c illustrates a GHM traffic carrier waveform employing 1, 4, and 7 tones, respectively, each having zero phases.

Considering a single transmitted tone, $\sigma e^{j\omega(t+\phi)}$, the receive unit may receive the transmitted signal via many paths. It is assumed that the symbol interval is much longer than the time taken by the signal to traverse any of these paths. The relevant calculus for analyzing this case follows.

A steady state is assumed to be quickly achieved. This means that the signals from all paths arrive at the receive unit within a small fraction of the symbol interval. It is clear that the received signal will be a tone of the same frequency as the transmitted tone since Doppler effects are assumed to be negligible. The received tone will have an amplitude and a phase. Let these quantities be respectively denoted as m and C. The problem can be approached in an inherently inductive manner by considering the sum of two path components. The first component may, without loss of generality, be assumed to have unity amplitude and phase A. The second component is assumed to have amplitude $\sigma$ and phase B. The relevant equation is then:

$$me^{jC} = e^{jA} + \sigma e^{jB}, \quad (\sigma, m \geq 0) \tag{1}$$

By equating real and imaginary parts:

$$m = \sqrt{1 + 2\sigma(A - B) + \sigma^2} \tag{2}$$

and $$C = \tan^{-1} \frac{\sin A + \sigma \sin B}{\cos A + \sigma \cos B} \tag{3}$$

Phases A and B may be defined as:

$$A = \omega d_1; \quad B = \omega d_2 \tag{4}$$

where $d_1$ and $d_2$ are effective distances and $\omega$ is the angular frequency of the tone. It is therefore clear that $C = C(\omega, d_1, d_2)$. It will be useful to know how C varies with $\omega$.

The change of C with respect to $\omega$ for each tone is described by:

$$\frac{dC}{d\omega} = \frac{d_1 + \sigma(d_1 + d_2)\cos\omega(d_1 - d_2) + \sigma^2 d_2}{1 + 2\sigma\cos\omega(d_1 - d_2) + \sigma^2} \tag{5}$$

Figure 2:
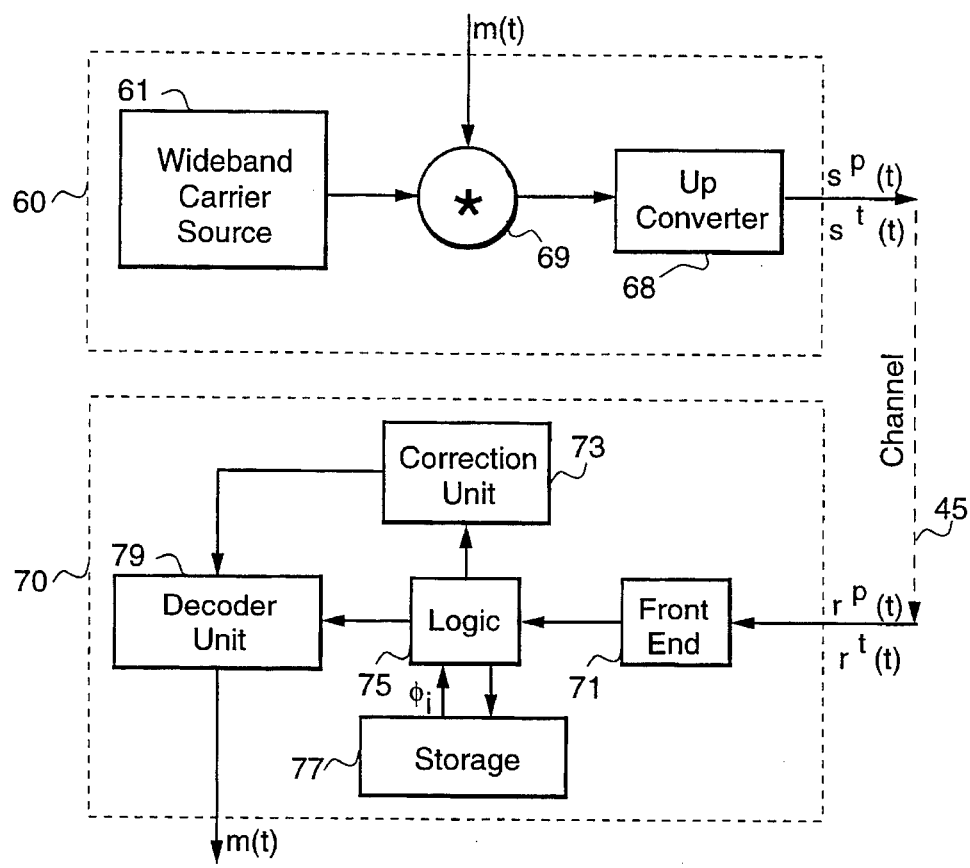
FIG. 2 is a simplified block diagram of a communications system according to the present invention.

FIG. 2 is a block diagram of a communications device incorporating the present invention. A transmit unit 60 operates either in a preamble mode transmitting a signal $s^p(t)$ to a receive unit 70 through a channel with the received signal being $r^p(t)$. Transmit unit 60 also operates in a traffic mode and produces a signal $s^t(t)$ which is received by receive unit 70 as signal $r^t(t)$. The preamble mode is used for synchronization and sounding. The preamble mode is employed in transmitting a message signal m(t) from transmit unit 60 to be decoded at receive unit 70.

Transmit unit 60 employs a wideband carrier source 61 which produces a preamble carrier signal in the preamble mode and a traffic carrier signal in the traffic mode. One such embodiment is a preamble carrier which is the sum of tones, each tone having a fixed frequency, phase and magnitude. The carrier waveform for the traffic mode can be the product of these tones.

During the preamble mode, wideband carrier source produces the preamble carrier signal which bypasses the modulation unit 69 and is provided to an up converter 68. Up converter 68 produces preamble signal $s^p(t)$ which passes through the channel and is received as signal $r^p(t)$ by receive unit 70. A front end 71 determines the baseband signal which is provided to a logic unit 75. Logic unit 75 determines if transmit unit 60 is in the preamble or traffic mode. If it determines that transmit unit 60 is in the preamble mode, it extracts phases of the tones and provides them to a correction unit 73. Logic unit 75 determines if transmit unit 60 is in the preamble mode by comparing the phases for the frequencies it receives from phases stored in a storage device 77.

Correction unit 73 determines a phase correction $dC/d\omega$ as described in Eq. (5). This correction information is stored for use in the traffic mode.

Once transmit unit enters the traffic mode, wideband carrier source 61 produces a traffic carrier waveform and provides it to a modulation unit 69. Modulation unit 69 encodes a message desired to be transmitted m(t) and provides the encoded signal to up converter 68 for transmission to receive unit 70. At receive unit 70, the receive signal $r^p(t)$ is brought down to baseband by front end unit 71. Logic unit 75 determines that transmit unit 60 is in the traffic mode and provides the signal to a decoding unit 79.

Correction unit 73 also provides phase correction information to decoding unit 79. Decoding unit 79 determines a phase correction specific to each frequency of the receive signal which is to be decoded. Since the receive signal would be a composite of several tones, the phase correction varies by frequency. The phase correction is defined in Eq. (5).

The signal may be properly decoded now since the effect of multipath propagation as the signal passed through the channel has been corrected, the decoded signal will more accurately reflect the transmitted signal and the decoded message more accurately reflect the message m(t) which was originally provided to transmit unit 60.

For applications where the multiple paths are received within a short time period as compared with a symbol period, as in a local area network, it can reasonably be assumed that $\omega d_1, \omega d_2 \ll 1$ and thus $dC/d\omega$ may be taken as linear over the operating frequency range. The present invention can be made to work in local multipath for local area networks by estimating $dC/d\omega$ and applying this correction prior to decoding.

The derivative $dC/d\omega$ may be conveniently estimated by modifying the decoding process to make it a two step procedure. In the first step, all of the tone phases $\{\phi_i\}$ are set to zero. Transmit unit transmits a carrier signal to a receive unit which determines the presence of a plurality of tones and estimates $\phi_1, \phi_2, \phi_3, \ldots, \phi_n$, by constraining $\phi_0$ to zero. The receive unit estimates $dC/d\omega$ by fitting a straight line to the $\phi_1, \phi_2, \phi_3, \ldots, \phi_n$, versus $\omega$.

After a number of symbol intervals, the transmit unit enters the second step of the process. The receive unit determines a correction phase for each tone of a subsequent carrier signal calculated from the estimated $dC/d\omega$ correction. Phases of the carrier signal are determined and the correction phase subtracted to correct for multipath phase distortion introduced by the local area network channel.

Figure 3:
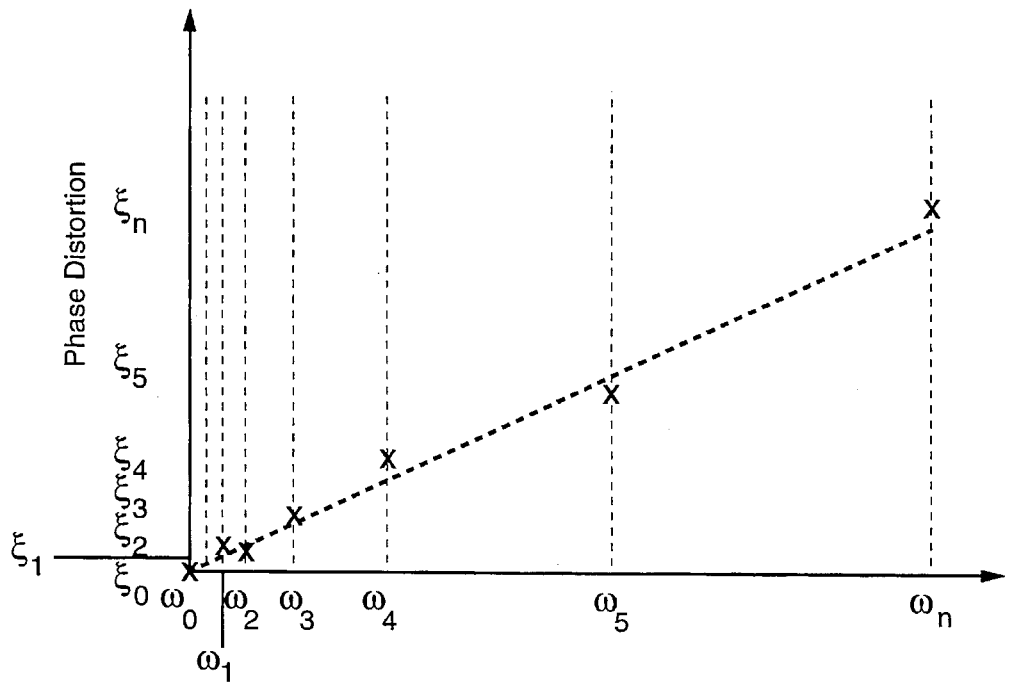
FIG. 3 is a graph of extracted phase vs. tone frequency employed in determining phase distortion incurred during transmission through a channel in connection with the present invention.

FIG. 3 illustrates the received preamble phase $\xi_i$ for each of the tones plotted against the frequency of the tone. The original preamble frequencies were set to a predetermined phase known to the receive unit, here a zero phase, and transmitted through the channel to the receive unit. In order to facilitate synchronization, the phase of the lowest, or fundamental, tone is preferable always set to zero. The received signal exhibits phases which change with frequency to result in a linear approximation of $dC/d\omega$ as shown on the figure. This approximates distortion over frequency and this relationship may be used to correct for channel distortion.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of correcting phase distortion introduced in a carrier waveform having a plurality of tones, each tone having predefined frequency $\omega_i$, phase $\phi_i$ and magnitude $m_i$ for a symbol period, as the waveform is transmitted through a channel, comprising the steps of:

a) receiving the transmitted waveform;

b) extracting a phase $\phi_i'$ and magnitude $m_i'$ from each of a plurality of tones having frequencies $\omega_i'$ in the transmitted waveform;

c) comparing the extracted phases/magnitudes ($\phi_i',m_i'$) to said predefined phases/magnitudes ($\phi_i,m_i$) of the same frequency $\omega_i=\omega_i'$ to determine a phase distortion $\xi_i$ for each tone;

d) determining channel distortion relation $dC/d\omega$ being change in phase $\phi$ per change in frequency $\omega$ due to said channel from the phase distortions $\xi_i$ determined for each corresponding tone;

e) employing the channel distortion relation $dC/d\omega$ to correct a message waveform comprised of a plurality of message tones transmitted through said channel.

2. The method of correcting phase distortion of claim 1 wherein the step of determining a channel distortion relation comprises the steps of:

a) fitting a line to points defined on a tone frequency vs. tone phase plot for the extracted phases $\phi_i'$;

b) determining a slope of the fitted line to determine channel distortion relation $dC/d\omega$.

3. The method of correcting phase distortion of claim 1 wherein the step of employing the channel distortion relation $dC/d\omega$ to correct the message waveform comprises the steps of:

a) determining frequencies, phases and magnitudes of the message tones;

b) determining a phase adjustment $a_i$ corresponding to each message tone frequency according to the determined channel distortion relation $dC/d\omega$;

c) subtracting each phase adjustment $a_i$ from its corresponding message phase to correct phase distortion.

4. A method of correcting phase distortion introduced in a geometric harmonic modulation (GHM) carrier waveform having a plurality of tones, each tone having predefined frequency $\omega_i$ being a geometrically increasing multiple of a fundamental frequency, phase $\phi_i$ and magnitude $m_i$ for a symbol period, as the GHM waveform is transmitted through a channel, comprising the steps of:

a) receiving the transmitted GHM waveform;

b) extracting a phase $\phi_i'$ and magnitude $m_i'$ from each of a plurality of tones having frequencies $\omega_i'$ in the transmitted GHM waveform;

c) comparing the extracted phases/magnitudes ($\phi_i',m_i'$) to said predefined phases/magnitudes ($\phi_i,m_i$) of the same frequency $\omega_i=\omega_i'$ to determine a phase distortion $\xi_i$ for each tone;

d) determining channel distortion relation $dC/d\omega$ being change in phase $\phi$ per change in frequency $\omega$ due to said channel from the phase distortions $\xi_i$ determined for each corresponding tone;

e) employing the channel distortion relation $dC/d\omega$ to correct a message waveform comprised of a plurality of message tones transmitted through said channel.

5. The method of correcting phase distortion of claim 4 wherein the step of determining a channel distortion relation comprises the steps of:

a) fitting a line to points defined on a tone frequency vs. tone phase plot for the extracted phases $\phi_i'$;

b) determining a slope of the fitted line to determine channel distortion relation $dC/d\omega$.

6. The method of correcting phase distortion of claim 4 wherein the step of employing the channel distortion relation $dC/d\omega$ to correct the message waveform comprises the steps of:

a) determining frequencies, phases and magnitudes of the message tones;

b) determining a phase adjustment $a_i$ corresponding to each message tone frequency according to the determined channel distortion relation $dC/d\omega$;

c) subtracting each phase adjustment $a_i$ from its corresponding message phase to correct phase distortion.

* * * * *